(12) United States Patent
Kuylenstierna

(10) Patent No.: US 12,253,206 B2
(45) Date of Patent: Mar. 18, 2025

(54) FLYWHEEL HOUSING ASSEMBLY, A VEHICLE AND A METHOD OF MANUFACTURING A FLYWHEEL HOUSING ASSEMBLY

(71) Applicant: VOLVO TRUCK CORPORATION, Gothenburg (SE)

(72) Inventor: Claes Kuylenstierna, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/510,860

(22) Filed: Nov. 16, 2023

(65) Prior Publication Data

US 2024/0167611 A1 May 23, 2024

(30) Foreign Application Priority Data

Nov. 23, 2022 (EP) ..................................... 22209073

(51) Int. Cl.
*F16M 1/026* (2006.01)
*F01M 11/00* (2006.01)

(52) U.S. Cl.
CPC ........ *F16M 1/026* (2013.01); *F01M 11/0004* (2013.01); *F01M 2011/0012* (2013.01)

(58) Field of Classification Search
CPC .............. F16M 1/026; F01M 11/0004; F01M 2011/0012
See application file for complete search history.

(56) References Cited

U.S. PATENT DOCUMENTS

| 4,719,892 A | 1/1988 | Lopez-Crevillen |
| 2021/0138979 A1* | 5/2021 | Hoshino ................. F02B 77/04 |

FOREIGN PATENT DOCUMENTS

| DE | 102017202776 A1 | 8/2018 |
| KR | 20030021312 A | 3/2003 |
| WO | 2010077189 A1 | 7/2010 |
| WO | 2017126429 A1 | 7/2017 |

OTHER PUBLICATIONS

Extended European Search Report in corresponding European Application No. 22209073.0 dated May 26, 2023 (9 pages).

* cited by examiner

*Primary Examiner* — Jacob M Amick
*Assistant Examiner* — Charles J Brauch
(74) *Attorney, Agent, or Firm* — Venable LLP; Jeffri A. Kaminski

(57) ABSTRACT

A flywheel housing assembly for an internal combustion engine includes a flywheel housing for accommodating a flywheel. The flywheel housing is configured to connect with a part of the internal combustion engine, the flywheel housing further having an outer side region intended to face an oil pan of the internal combustion engine, wherein the outer side region comprises a through hole and a vibration absorbing material portion arranged to seal the through hole.

13 Claims, 6 Drawing Sheets

FLYWHEEL HOUSING ASSEMBLY, A VEHICLE AND A METHOD OF MANUFACTURING A FLYWHEEL HOUSING ASSEMBLY

TECHNICAL FIELD

The disclosure relates to a flywheel housing assembly for an internal combustion engine. The disclosure also relates to a vehicle comprising such a flywheel housing assembly, and a method of manufacturing such a flywheel housing assembly. The disclosure can be applied in vehicles, such as trucks, buses and construction equipment. The disclosure can be applied in heavy-duty vehicles, such as trucks, buses, and construction equipment. Although the disclosure may be described with respect to a particular type of vehicle, the disclosure is not restricted to any particular vehicle.

BACKGROUND

In the field of internal combustion engine systems for heavy-duty vehicles, there is a desire to reduce noise from various components. In general, the need for a noise reducing arrangement is more significant for engines of heavy-duty vehicles compared to passenger car engines as engines of heavy-duty vehicles generally emit more noise due to size and power of the engine.

One example of a noise reducing arrangement for internal combustion engine systems is to provide one or more engine components with shields of noise insulating material. However, such noise shields provide a thermal insulation which may require additional cooling of the engine.

The flywheel of the internal combustion engine system is a structural part that may be particularly interesting to consider in terms of noise. WO 2010/077189 A1 discloses one example of a noise shield patch for a flywheel housing assembly. These types of noise shields are generally configured to isolate the noise.

However, there is also an increasing demand for reducing noise from the flywheel housing to fulfil even more restrictive requirements with respect to emissions and noise. Thus, despite the activity within the field of flywheel housings and flywheel housing assemblies, there is a need for an improved arrangement for reducing noise from a flywheel housing of an internal combustion engine system.

SUMMARY

According to a first aspect of the disclosure, there is provided a flywheel housing assembly for an internal combustion engine. The flywheel housing assembly comprises a flywheel housing for accommodating a flywheel. The flywheel housing is configured to connect with a part of the internal combustion engine and further having an outer side region intended to face an oil pan of the internal combustion engine. The outer side region comprises a through hole and a vibration absorbing material portion arranged to seal the through hole.

The first aspect of the disclosure may seek to provide an improved flywheel housing assembly for reducing noise emissions, while maintaining a reliable and easy-to-produce design of the flywheel housing assembly. It has been observed that the flywheel housing may be particularly noise emitting due to vibrations from the components of the ICE system. A technical benefit may include to provide a region of the flywheel housing with a less noise emitting material portion, thus improving the noise emission levels from internal combustion engine.

By the configuration of having a through hole and a vibration absorbing material portion arranged to seal the through hole at the outer side region intended to face the oil pan of the internal combustion engine, it becomes possible to reduce noise emission at a particularly noise emitting location of the flywheel housing without compromising on desired rigidity of the flywheel housing. In addition, it may be particularly beneficial to arrange the through hole and the vibration at the outer side region intended to face the oil pan of the internal combustion engine for space reasons as the available free space at, and/or around, the flywheel housing may be limited by other components of the ICE system. Inside the flywheel housing, there is generally a limited space due to the arrangement of the flywheel, whilst outside the flywheel housing there is generally a limited space due to the adjacent locations of the components of the internal combustion engine system etc. The proposed flywheel housing assembly provides a noise reduction arrangement that may not increase the demand of additional free space at, and/or around, the flywheel housing. To this end, the configuration of the vibration absorbing material portion arranged to seal the through hole at the outer side region intended to face the oil pan further allows for reducing noise in an efficient manner in terms of required available space for noise reducing system.

Further, by providing a through hole in the flywheel housing and a vibration absorbing material portion arranged to seal the through hole, it becomes possible to replace a noise emitting area of the flywheel housing with a less noise emitting material portion, while maintaining required rigidity of the flywheel housing.

The through hole may generally be a pre-cut from a flywheel housing. Hereby, there is provided a vibration resistant cover for closing a pre-cut of the flywheel housing. In some examples, the through hole is created during manufacturing of the flywheel housing. By way of example, the flywheel housing may be a casted unit provided with the through hole.

In some examples, the through hole and the vibration absorbing material portion may be complementary in shape. A technical benefit may include a more cost-efficient manufacturing of the flywheel housing. A technical benefit may include an even better sealing between the material portion and the flywheel housing outer side region.

In some examples, the vibration absorbing material portion may be arranged inside the through hole. Such arrangement may facilitate manufacturing and assembly of the flywheel housing assembly and the internal combustion engine for some vehicles.

In some examples, the vibration absorbing material portion may be securely attached to the outer side region. Such arrangement may facilitate manufacturing and assembly of the flywheel housing assembly and the internal combustion engine for some vehicles. A technical benefit may include an even better sealing between the material portion and the flywheel housing outer side region.

In some examples, the vibration absorbing material portion may be a plate-shaped material portion. A plate-shaped material portion may be advantageous for assembly reasons of the flywheel housing assembly and the ICE system.

In some examples, the vibration absorbing material portion may be made by an elastic material. Hereby, there is provided an even more noise reducing material portion. By way of example, the elastic material may be rubber.

In some examples, the outer side region may be part of a longitudinal end portion of the flywheel housing. In some examples, the outer side region may be part of a longitudinal end portion configured for attachment of the flywheel housing to the ICE.

In some examples, the flywheel housing may comprise a connection portion configured to connect the flywheel housing to the ICE. The outer side region may be further arranged spaced apart from the connection portion. A technical benefit may include an even better location of the vibration absorbing material portion in relation to the flywheel housing and any ICE component. The outer side region may be further arranged spaced apart from the connection portion in a vertical direction. The outer side region may be further arranged below the connection portion in the vertical direction.

By way of example, the flywheel housing is connected to a part of the ICE, such as an engine block, a timing gear plate and the like.

The connection portion may be any one of a part of the flywheel housing, such as a flange, and a separate part, such as timing gear plate. The connection portion may also include a fastening system, such as a bolt arrangement.

In some examples, the flywheel housing may comprise an opening for a crankshaft of the internal combustion engine.

According to a second aspect of the disclosure, there is provided an internal combustion engine, ICE, system. The ICE system comprises an ICE and a flywheel housing assembly according to the first aspect of the disclosure and/or any one of examples of the first aspect of the disclosure. Further, the outer side region is arranged with a distance from the oil pan so as to form a gap therebetween. Effects and features of the second aspect of the disclosure are largely analogous to those described above in connection with the first aspect. Also, a technical benefit may include an improved location of the vibration absorbing material portion in relation to the flywheel housing and any ICE component.

In some examples, the outer side region may be arranged to face the oil pan such that the through hole and the vibration absorbing material portion being located along a vertical side of the flywheel housing. The vertical side may generally correspond to the longitudinal end portion, or at least a part thereof.

In other words, the flywheel housing may be arranged spaced apart from the oil pan and with a distance from the oil pan so as to form a gap therebetween. Further, the outer side region may be arranged to face the oil pan, such that the through hole and the vibration absorbing material portion may be located along a vertical side of the flywheel housing and at the gap between the flywheel housing and the oil pan.

According to a third aspect of the disclosure, there is provided a vehicle comprising a flywheel housing assembly according to the first aspect of the disclosure and/or an internal combustion engine, ICE, system according to the second aspect of the disclosure.

According to a fourth aspect of the disclosure, there is provided a method for producing a flywheel housing assembly according to the first aspect of the discourse. The method comprises providing a flywheel housing for accommodating a flywheel, the flywheel housing having an outer side region intended to face an oil pan of the internal combustion engine; forming a through hole at a portion of the outer side region; and arranging a vibration absorbing material portion at the through hole, such that the vibration absorbing material portion is arranged to seal the through hole.

The vibration absorbing material may be arranged over the through hole. Alternatively, or in addition, the vibration absorbing material may be arranged inside the through hole. Alternatively, or in addition, the vibration absorbing material may be arranged inside the flywheel housing and arranged to cover the through hole. Alternatively, or in addition, the vibration absorbing material may be arranged outside the flywheel housing and arranged to cover the through hole.

Effects and features of the third, fourth and fifth aspects are largely analogous to those described above in relation to the first aspect and the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
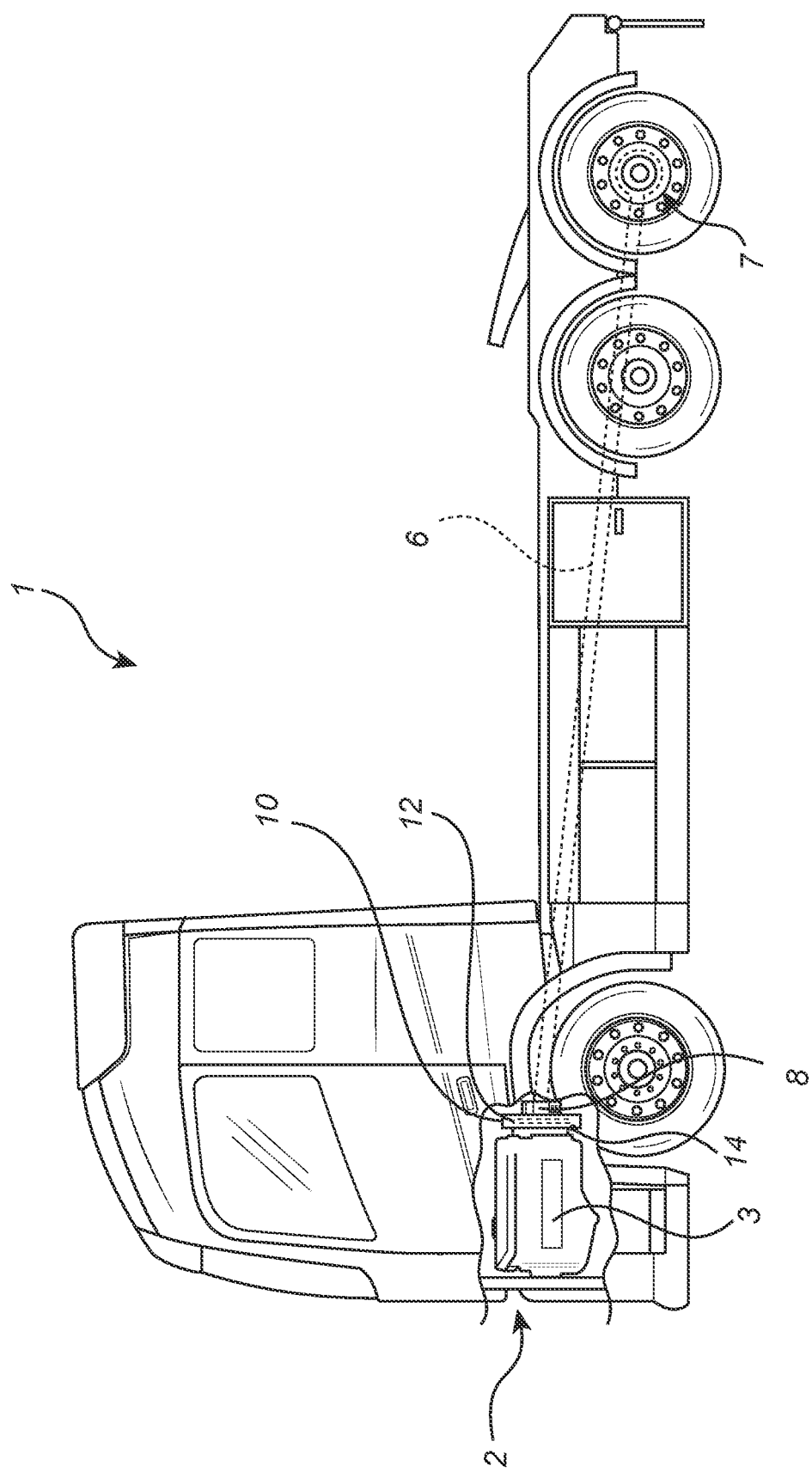
FIG. 1 is an exemplary vehicle according to one example.

FIG. 1 schematically shows a vehicle 1 according to an example. The vehicle 1 includes an internal combustion engine, ICE, system 2 having an internal combustion engine 3. The ICE 3 is connected to a crankshaft (not shown), to which a flywheel 12 of a flywheel housing assembly 10 is connected for common rotation. A drive shaft 6 connects the ICE 3 to driving wheels 7 of the vehicle 1 via a transmission 8 connected to the flywheel 12 via a clutch (not shown).

Figure 2:
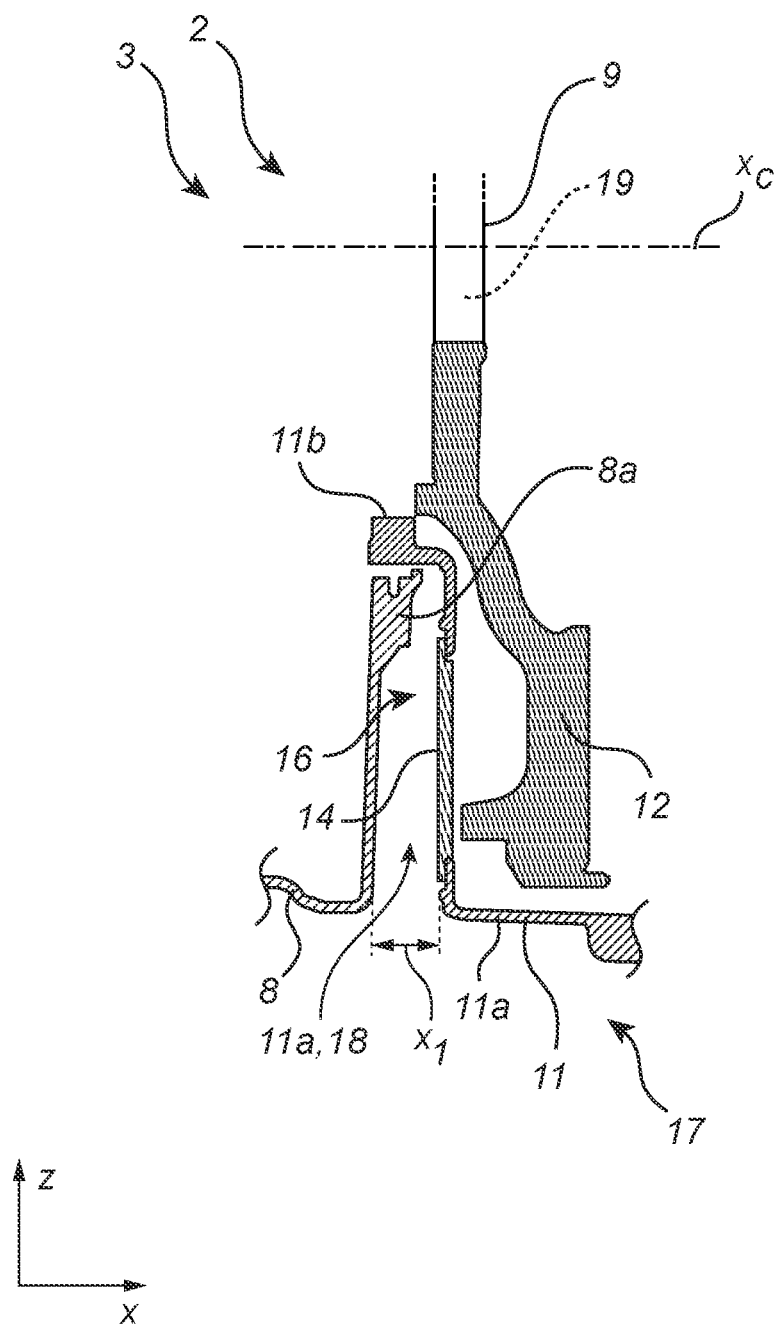
FIG. 2 is a cross-sectional side view of an exemplary internal combustion engine, ICE, system according to one example.
Figure 7:
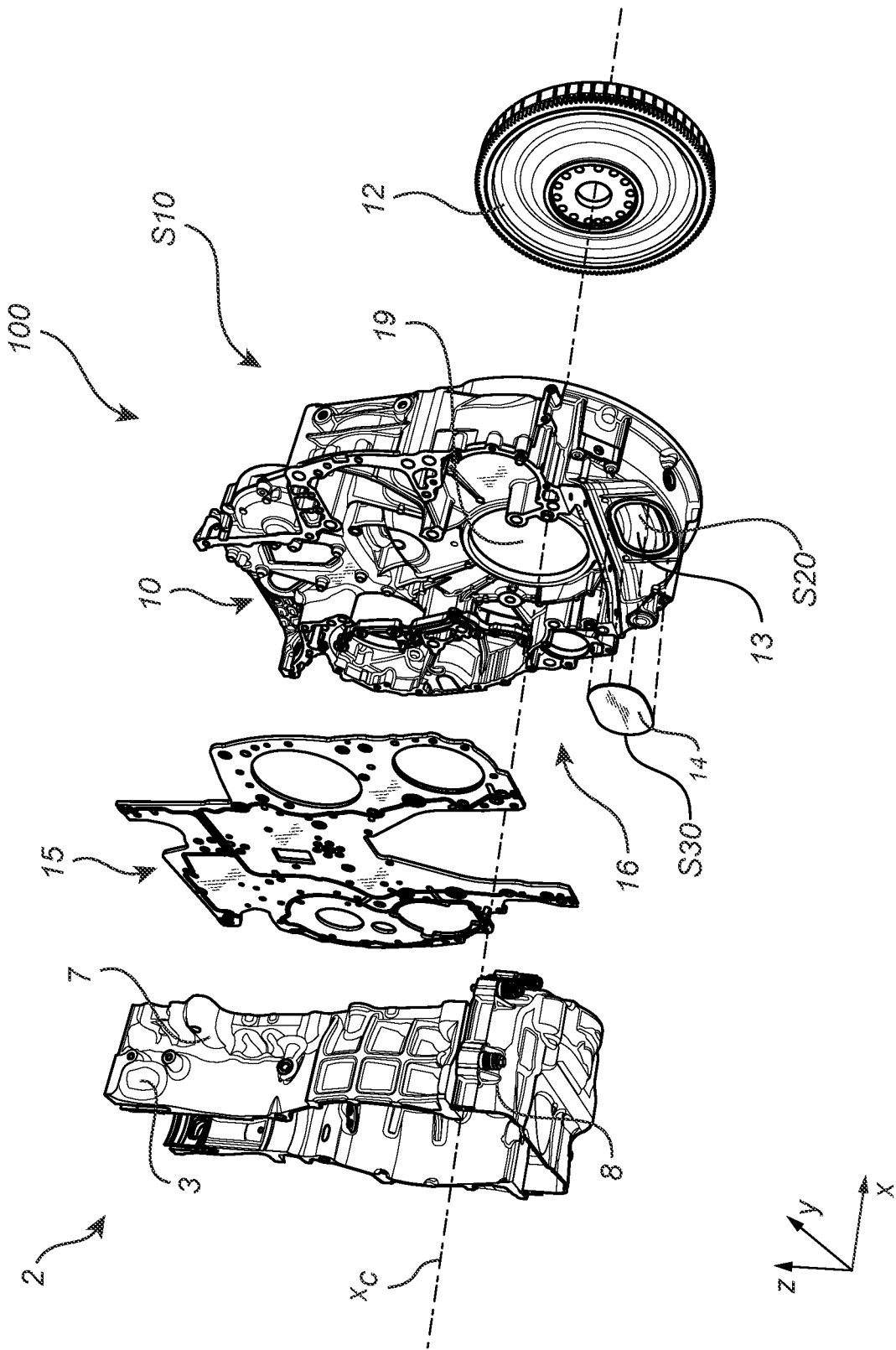
FIG. 7 is an exploded view of parts of a flywheel housing assembly of the ICE in FIG. 2, according to one example.

The ICE system 2 comprising the ICE 3 and the flywheel housing assembly 10 is shown in closer detail in FIG. 2. Further details of the flywheel housing assembly 10 according to an example is shown in closer detail in FIGS. 3 to 6. Reference is also made to FIG. 7, in which the flywheel housing assembly 10 is shown in an exploded view. FIG. 7 here also schematically illustrates a method for producing the flywheel housing assembly according to an example.

The flywheel housing assembly 10 will now be further described in an orientation to the ICE 3, as illustrated in the figures, e.g. FIG. 2, in combination with FIGS. 3 to 7. However, the orientation of the ICE 2 and the flywheel housing assembly 10 as depicted in FIG. 2 is merely used as an example for ease of understanding the connection/attachment of the flywheel housing assembly 10 to the ICE 3. Hence, other attachment arrangements and orientations of the flywheel housing assembly 10 to the ICE 3 may be conceivable. As indicated in e.g. FIGS. 2 to 7, the ICE system 2 has an extension in a longitudinal direction X, an extension in a transverse direction Y and an extension in a vertical direction Z. In this coordinate system, the X-direction is parallel to the main extension of the ICE system 2. In addition, in this coordinate system, the X-direction is parallel to a longitudinal axis of the ICE 3, as well as a parallel to a longitudinal axis of the flywheel housing assembly 10. The Y-direction is parallel to the transvers extension of the ICE system 2 and the Z-direction is parallel to the vertical direction of the ICE system 2. In a similar vein, as indicated in e.g. FIGS. 2 to 7, the flywheel housing assembly 10 has an extension in the longitudinal direction X, an extension in the transverse direction Y and an extension in the vertical direction Z. The Y-direction is parallel to the transvers extension of the flywheel housing assembly 10 and the Z-direction is parallel to the vertical direction of the flywheel housing assembly 10.

Turning now to FIG. 2, which is a cross-sectional part of a portion of the ICE system 2, more specifically, a bottom portion of the ICE system 2 extending along the longitudinal and vertical directions X and Z. As depicted in FIG. 2, the ICE system 2 comprises the ICE 3 and the flywheel housing assembly 10 having the flywheel 12. The ICE 3 may also comprise an engine block 7, which is indicated in e.g. FIGS. 6 and 7. The ICE 3 and the flywheel housing assembly 10 can be encompassed in a common casing, which generally defines the outer contour of the ICE system 2. In addition, or alternatively, the ICE 3 and the flywheel housing assembly may be encompassed in separate housings.

The flywheel housing assembly 10 comprises a flywheel housing 11, as partly illustrated in FIGS. 2 to 6, and more closely in FIG. 7. The flywheel housing 11 can be shaped in different ways, but generally defines an inner volume for the flywheel 12. As depicted in FIG. 2, the flywheel housing assembly 10, and thus the flywheel housing 11, is here arranged at the rear of the ICE 3, pointing to the rear side of the vehicle 1 in a mounted state of the flywheel housing assembly 10. By way of example, the flywheel housing assembly 10, and thus the flywheel housing 11, is arranged apart from the ICE 3 in the longitudinal direction X. Other arrangements may also be conceivable.

Moreover, as illustrated in FIG. 2, the ICE 3 comprises an oil pan 8. The oil pan 8 may be an integral part of the ICE 3 or a part connected to the ICE 3. The oil pan 8 is arranged as a lowermost part of the ICE 2. In addition, the oil pan 8 is arranged to face the flywheel housing 10, as illustrated in e.g. FIG. 2. By way of example, the oil pan is arranged e.g. 150 mm below a crankshaft center, as defined by the longitudinal crankshaft center axis Xc in FIG. 2 and FIG. 7. The ICE system 2 and the ICE may comprise additional components as is commonly known in the art.

Figure 3:
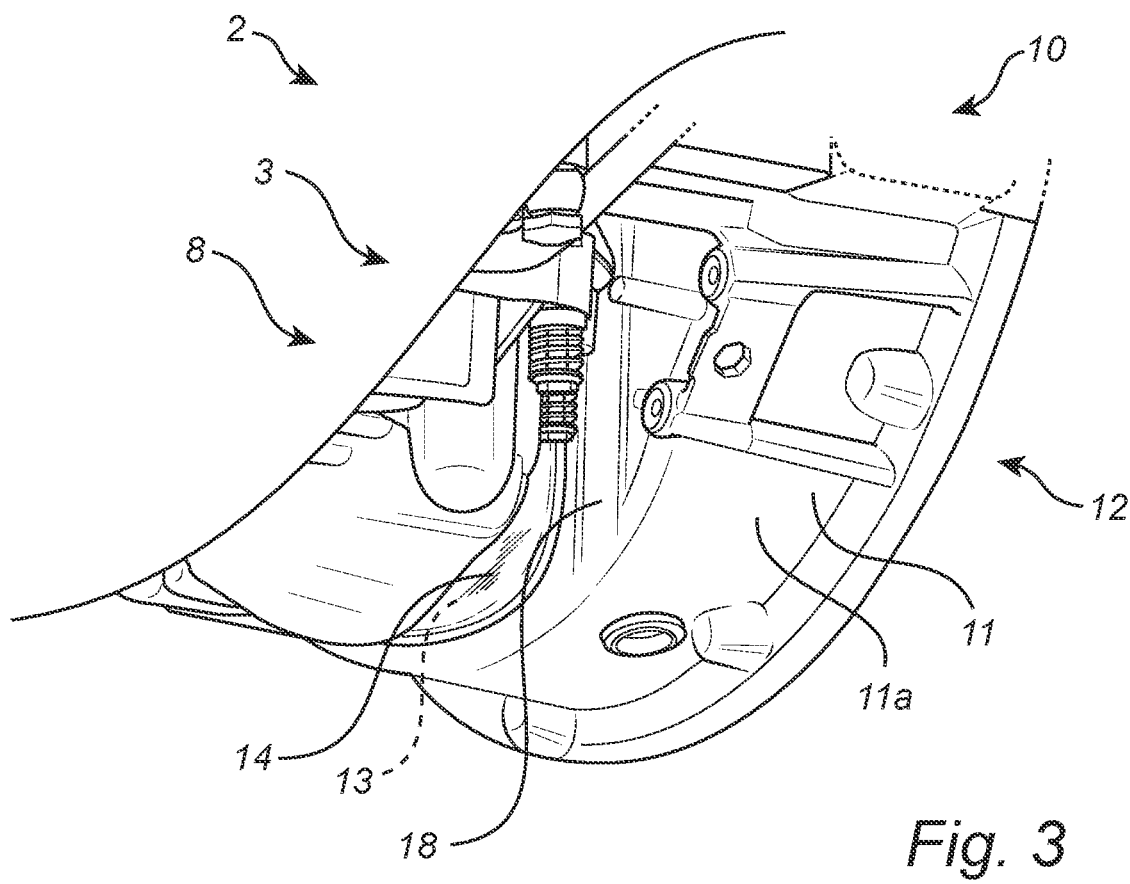
FIG. 3 is a perspective view of parts of a flywheel housing assembly of the ICE in FIG. 2, according to one example.

Turning again to the flywheel housing 11 of the flywheel housing assembly 10, the flywheel housing 11 is configured to accommodate the flywheel 12, as illustrated in FIG. 2, and further in FIGS. 3 to 7. The flywheel housing 11 is normally the lowest point of the ICE system 2, in the vertical direction Z because it may need to cover a bottom region of the rotating flywheel 12. The flywheel housing 11 is normally cylindrically shaped at least in its bottom section 17, as illustrated in FIG. 3. The bottom section 17 of the flywheel housing may often extend 250 mm beneath the crankshaft 9.

The flywheel housing 11 can be connected to the ICE 2 in any suitable manner. By way of example, the flywheel housing 11 is connected to the ICE via a connection portion 15. The connection portion 15 is configured to connect the flywheel housing 11 to the ICE 3. The connection portion 15 is e.g. a so-called timing gear plate, as illustrated in FIG. 7. In addition, or alternatively, the flywheel housing 11 may be attached to the engine block 7 and/or to another part of a casing of the ICE 3. In addition, or alternatively, the flywheel housing 11 may be attached to the oil pan 8 by a fastener (not illustrated). By way of example, as illustrated in FIG. 2, the flywheel housing 11 comprises a flange portion 11b arranged to connect with a corresponding flange portion 8a of the oil pan 8. The flange portion 11b is here connected to the flange portion 8a of the oil pan 8 by one or more bolts (not illustrated). The connection portion 15 may thus also be provided in the form of one or more bolts or a fastening system. In this example, as illustrated in FIGS. 2 to 7, the flywheel housing 11 comprises the connection portion 15. Thus, the flywheel housing 11 is configured to connect with a part of the ICE 3, as depicted in FIG. 2 and FIG. 7.

Figure 4:
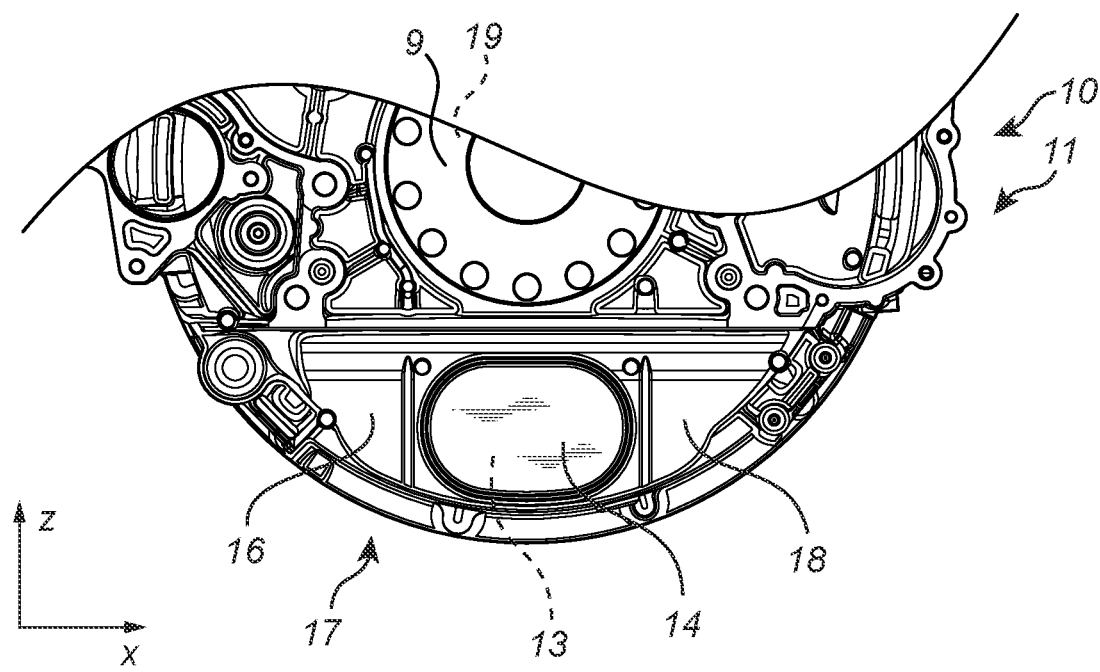
FIGS. 4 and 5 are lateral views of parts of a flywheel housing assembly of the ICE in FIG. 2, according to one example.
Figure 5:
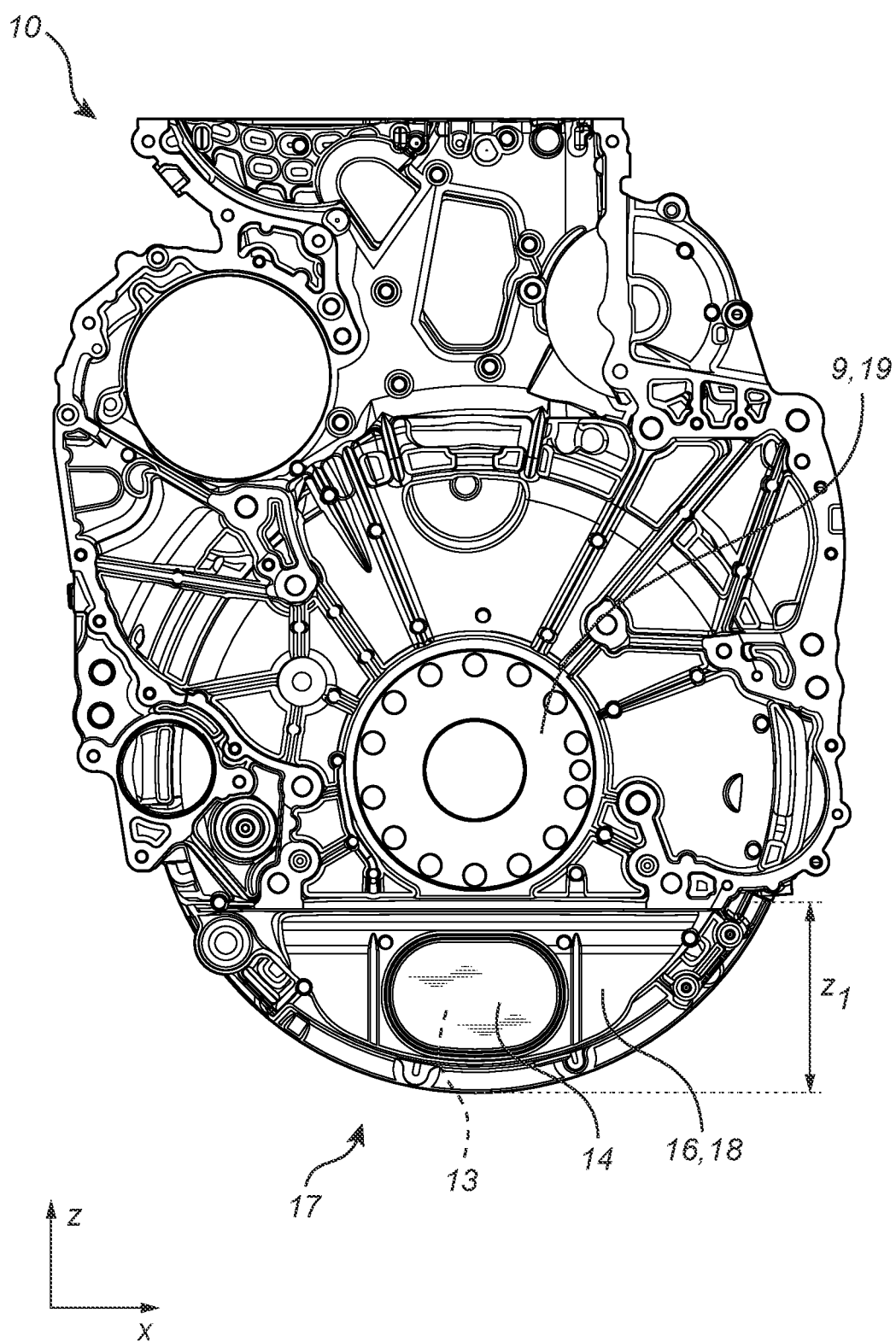
Figure 6:
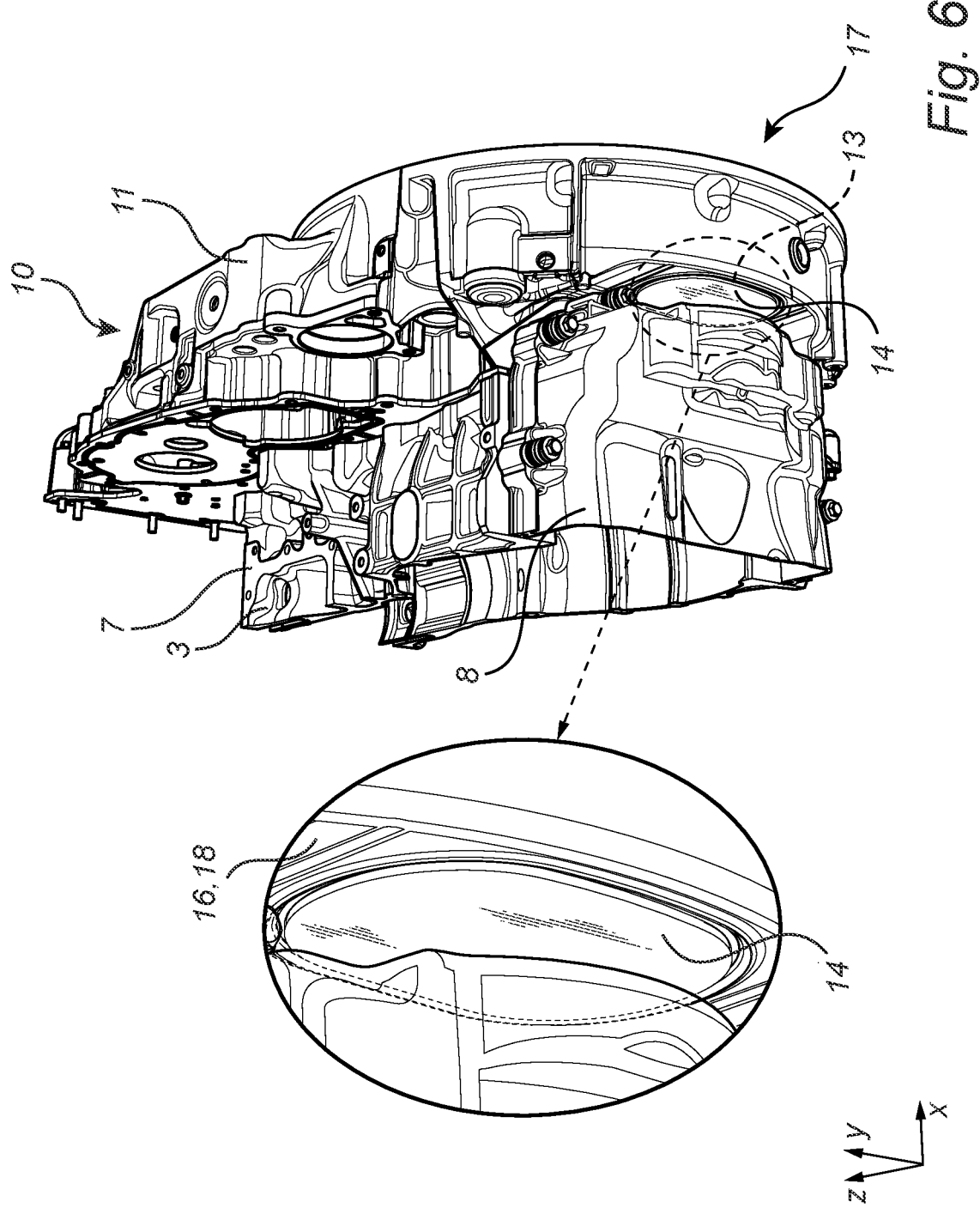
FIG. 6 is a perspective view of parts of a flywheel housing assembly of the ICE in FIG. 2, according to one example.

Further, as illustrated in FIG. 2, and also in FIGS. 4 and 7, the flywheel housing 11 comprises an opening 19 for the crankshaft 9. The crankshaft 9 is an integral part of the ICE system 2. The flywheel 12 is configured to be connected to the crankshaft 9 of the ICE system 2 for common rotation about the center axis Xc. The crankshaft is only schematically illustrated in FIG. 2. It should be noted that the crankshaft 9 generally extend along the center axis Xc, and across the ICE 3 and the flywheel housing 11.

Turning again to FIG. 2 in combination with e.g. FIG. 3, the flywheel housing 11 comprises a circumferential surface section 11a having a number of outer surface regions. In this example, as illustrated in FIGS. 2 to 7, the flywheel housing 11 comprises at least an outer side region 18. The circumferential surface sections may collectively define the outer surface of the flywheel housing 11, where the outer side region 18 is one of many surface sections of the flywheel housing 11.

As illustrated in FIG. 2, the outer side region 18 is arranged on the bottom section 17 of the flywheel housing. The outer side region 18 extends in the vertical direction Z. Thus, the outer side region 18 is a vertically extending side region of the bottom section 17 of the flywheel housing 11, as illustrated in FIG. 2. The bottom section 17 is the lower part, preferably the lowermost part, of the flywheel housing assembly 10, as seen in the vertical direction Z, and as illustrated in FIGS. 2 to 7.

The outer side region 18 is further arranged vertically underneath the connection point (e.g. the connecting portion 15) between the ICE 3 and the flywheel housing 12.

Moreover, as illustrated in FIGS. 2 to 7, the outer side region 18 is here part of a longitudinal end portion 16. The longitudinal end portion 16 extends in the transverse direction Y and in the vertical direction Z. The longitudinal end portion 16 may also include the connection portion 15 for attachment of the flywheel housing 12 to the ICE 3. At least parts of the longitudinal end portion 16 may be an integral part of the circumferential surface section 11a.

As further illustrated in FIGS. 2 to 7, the outer side region 18 is arranged on the flywheel housing 11 to face the oil pan 8. As depicted in e.g. FIG. 2, the outer side region 18 is arranged with a distance X1 to the oil pan 8, as seen in the longitudinal direction X. Hence, in this example, the outer side region 18 is arranged with a longitudinal distance X1 to the oil pan 8.

As such, there is provided a free space between the oil pan 8 and the outer side region 8 of the flywheel housing assembly 10, which is defined by the distance x1. Due to packaging and installation requirements on the components making up the ICE system 2, the free space, i.e. the distance X1, should be kept to a minimum. While the distance X1 may vary for different installations and ICE systems, the distance X1 should be wide enough to fit the frame of the oil pan 8, e.g. a flange portion 8a of the oil pan 8, as depicted in FIG. 2.

The flywheel housing 11 is thus arranged spaced apart from the oil pan 8 by a distance X1 from the oil pan 8 so as to form a gap (the free space) therebetween. The gap is depicted in FIG. 2 with the distance X1. As such, the outer side region 18 is arranged with the distance X1 from the oil pan so as to form a gap between the outer side region 18 and a part of the oil pan 8, e.g. a vertical side part of the oil pan, as illustrated in FIG. 2.

In addition, the outer side region 18 extends in the vertical direction Z with an extension Z1, as illustrated in e.g. FIG. 2. The extension Z1 is here defined as the distance between vertical end points of the outer side region 18, as illustrated in FIG. 2.

However, this arrangement of the flywheel housing 11 being located close to the ICE 2 may create a so called "loudspeaker syndrome", causing vibrations and noise within the ICE system 2. In addition, due to the thin section between the oil pan 8 and the flywheel 12, as illustrated by the distance X1, it may generally be difficult to fit any noise protecting solutions outside the outer side region 18.

The outer side region 18 is therefore configured to reduce any noise from the above arrangement. The noise reducing part is here provided by a through hole 13 and a corresponding vibration absorbing material 14, as illustrated in FIGS. 2 to 7. More specifically, as illustrated in FIG. 2, and further in FIGS. 3 and 4, the outer side region 18 comprises a through hole 13. The through hole 13 is also illustrated in FIG. 7.

FIG. 3 depicts a bottom view of the flywheel housing assembly 10 of FIG. 2, while FIG. 4 shows a side view of the flywheel housing assembly 10 of FIG. 2 at the oil pan 8 side. As can be seen from FIGS. 3 and 4, the free outside surface area of the flywheel housing 11 for any additional feature or component is rather limited.

As mentioned above, the flywheel housing assembly 10 comprises the vibration absorbing material portion 14. As illustrated in FIGS. 2 to 4, the vibration absorbing material portion 14 is arranged to seal the through hole 13.

The vibration absorbing material portion 14 is located at, or on, an outer surface (corresponding to the outer side region 18) of the flywheel housing 11. The outer side region 18 is arranged between the flywheel 12 and the oil pan 8, as seen in the longitudinal direction X. This is also further illustrated in e.g. FIG. 6, which is a perspective view of parts of the flywheel housing 11 in FIG. 2, where the flywheel housing assembly 10 is illustrated in a slightly inclined orientation so as to depict the lowermost part (bottom section 17) of the flywheel housing 11.

The outer side region 18 is arranged to face the oil pan 8, such that the through hole 13 and the vibration absorbing material portion 14 are located along the longitudinal end portion 16 extending in the vertical direction Z of the flywheel housing 12. In addition, the through hole 13 and the vibration absorbing material 14 are arranged at the gap defined by the distance X1 between the flywheel housing 12 and the oil pan 8. In the figures, the longitudinal end portion 16 is a vertical side of the flywheel housing 11. Hence, the outer side region 18 is arranged to face the oil pan 8 such that the through hole 13 and the vibration absorbing material portion 14 are located along the vertical side of the flywheel housing 11.

The vibration absorbing material portion 14 provides for reducing noise from the flywheel 12. Hence, the vibration absorbing material portion 14 provides for an improved noise abatement.

As illustrated in FIGS. 2 to 6, the vibration absorbing material portion 14 covers closely the through hole 13 at the outer side region 18 of the bottom section 17 of the flywheel housing 11.

As may be gleaned from FIGS. 2 to 4, the outer side region 18 encompasses only a small portion of the circumference of the flywheel housing 11. That is, the outer side region 18 is only a small portion of the circumferential surface section 11a. In a similar vein, the extension of the through hole 13 in the transverse direction Y and in the vertical direction Z encompasses only a small portion the outer side region 18. As such, the vibration absorbing material portion 14 encompasses only a small portion the outer side region 18.

The geometry and size of the through hole 13 may vary for different types of flywheel housing 11. The geometry and size of the through hole 13 is generally selected based on a desired level of noise reduction for the particular flywheel housing 11. By way of example, the through hole 13 has an extension in the vertical direction Z of about 4 cm to 15 cm, preferably the through hole 13 has an extension in the vertical direction Z of about 5 cm to 12 cm, still preferably the through hole 13 has an extension in the vertical direction Z of about 5 cm to 10 cm. In a similar vein, the through hole 13 has an extension in the transverse direction Y of about 4 cm to 15 cm, preferably the through hole 13 has an extension in the transverse direction Y of about 5 cm to 12 cm, still preferably the through hole 13 has an extension in the transverse direction Y of about 5 cm to 10 cm.

In addition, or alternatively, an area of the through hole 13, as defined in the transverse direction Y and the vertical direction Z, is about 25 cm2 to 100 cm2, preferably an area of the through hole 13, as defined in the transverse direction Y and the vertical direction Z, is about 40 cm2 to 80 cm2, still preferably, an area of the through hole 13, as defined in the transverse direction Y and the vertical direction Z, is about 50 cm2 to 70 cm2.

The area of the vibration absorbing material portion in relation to the through hole 13 may vary depending on attachment of the vibration absorbing material portion 14 to the outer side region 18. By way of example, the vibration absorbing material portion 14 may overlap the through hole 13 by a distance of about 1 cm around the through hole 13. In other examples, the vibration absorbing material portion is shaped to fit inside the through hole 13, as seen in the transverse direction Y and the vertical direction Z. Thus, the vibration absorbing material portion 14 can be provided in various shapes so as to seal the through hole 13.

By the above arrangement of the vibration absorbing material portion 14 and the through hole 13 on the outer side region 18, the vibration absorbing material portion 14 is arranged at a location which is vulnerable for emission of noise. In addition, by the above arrangement of the vibration absorbing material portion 14 on the outer side region 18, the vibration absorbing material portion 14 is provided to replace a normally noise emitting area of the flywheel housing 11. The vibration absorbing material portion 14 is thus arranged and configured to function as a vibration absorbent elastomer. Hereby, there is provided a vibration resistant cover for closing a pre-cut, such as the through hole 13, of a part of the flywheel housing 11, which is particularly subjected to noise, including vibration.

As further illustrated in FIGS. 2 to 7, the through hole 13 and the vibration absorbing material portion 14 are here complementary in shape. Each one of the through hole 13 and the vibration absorbing material portion 14 may resemble a circle, an oval, a triangle, a square and/or a rectangle. In FIGS. 2 to 7, the through hole 13 and the vibration absorbing material portion 14 are essentially circular or oval in the transverse and vertical directions Y and Z.

As also illustrated in FIGS. 2 to 6, the vibration absorbing material portion 14 is arranged inside the through hole 13. In this manner, the vibration absorbing material portion 14 prevents dirt from an outside to enter an inside of the flywheel housing 12.

The vibration absorbing material portion 14 is securely attached to the outer side region 18. The vibration absorbing material portion 14 is securely attached to the outer side region 18 by means of adhesive or rubber, but may also be securely attached by means of rivets etc.

Also, as further illustrated in FIGS. 2 to 7, the vibration absorbing material portion 14 is a plate-shaped material portion. By way of example, a thickness of the plate-shaped material portion corresponds to a thickness of the outer side region 18 of the flywheel housing 11. The thickness may be determined in view of size of the flywheel housing and desired the noise frequencies. Generally, the thicker the portion is, the better is the improvement in noise abatement.

The vibration absorbing material portion 14 is here made by an elastic material. By way of example, the elastic material is rubber.

To sum up, FIGS. 2 to 7 illustrates a flywheel housing assembly 10 according to one example. The flywheel housing assembly 10 is intended for the ICE 3. The flywheel housing assembly comprises the flywheel housing 11 for accommodating the flywheel 12. The flywheel housing 11 is configured to connect with a part of the ICE 3. The flywheel housing 11 has, or comprises, the opening 19 for the crankshaft 9. The flywheel housing 11 comprises the outer side region 18, which is intended to face the oil pan 8 of the ICE 3 in an assembled state with the ICE 3. Further, the outer side region 18 comprises the through hole 13 and the vibration absorbing material portion 14, which is arranged to seal the through hole 13.

As noted above, FIG. 7 also schematically shows a method of manufacturing a flywheel housing assembly 10 according to one example. The method 100 comprises a step of providing S10 a flywheel housing 11 for accommodating a flywheel 12. The flywheel housing has an outer side region 18 intended to face an oil pan 8 of the internal combustion engine 3. Moreover, the method 100 comprises a step of forming S20 the through hole 13 at a portion of the outer side region 18; and further a step of arranging S30 the vibration absorbing material portion 14 at the through hole 13, such that the vibration absorbing material portion 14 is arranged to seal the through hole 13.

The vibration absorbing material 14 is arranged over the through hole 13. Alternatively, or in addition, the vibration absorbing material may be arranged inside the through hole 13. The vibration absorbing material may likewise be arranged insider the flywheel housing 11 so as to cover the through hole 13 from the inside of the flywheel housing 11.

The through hole 13 can be made to an existing flywheel housing 11 having a solid outer side region 18 or be created during the manufacturing of the flywheel housing 11.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" or "longitudinal" or "transverse" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A flywheel housing assembly for an internal combustion engine, said flywheel housing assembly comprising a flywheel housing for accommodating a flywheel, the flywheel housing being configured to connect with a part of the internal combustion engine, the flywheel housing further having a solid outer side region intended to face an oil pan of the internal combustion engine, wherein the solid outer side region comprises a through hole and a vibration absorbing material portion arranged to seal the through hole.

2. Flywheel housing assembly according to claim 1, wherein the through hole and the vibration absorbing material portion are complementary in shape.

3. Flywheel housing assembly according to claim 2, wherein the vibration absorbing material portion is arranged inside the through hole.

4. Flywheel housing assembly according to claim 1, wherein the vibration absorbing material portion is securely attached to the solid outer side region.

5. Flywheel housing assembly according to claim 1, wherein the vibration absorbing material portion is a plate-shaped material portion.

6. Flywheel housing assembly according to claim 1, wherein the vibration absorbing material portion is made by an elastic material.

7. Flywheel housing assembly according to claim 6, wherein the elastic material is rubber.

8. Flywheel housing assembly according to claim 1, wherein the solid outer side region is part of a longitudinal end portion of the flywheel housing.

9. Flywheel housing assembly according to claim 1, wherein the flywheel housing comprises a connection portion configured to connect the flywheel housing to the ICE, and wherein the solid outer side region is further arranged spaced apart from the connection portion.

10. An internal combustion engine ("ICE") system, comprising an ICE and a flywheel housing assembly according to claim 1, wherein the solid outer side region is arranged with a distance from the oil pan so as to form a gap therebetween.

11. ICE system according to claim 10, wherein the solid outer side region is arranged to face the oil pan such that the through hole and the vibration absorbing material portion being located along a vertical side of the flywheel housing.

12. A vehicle comprising a flywheel housing assembly according to claim 1.

13. A method for producing a flywheel housing assembly according to claim 1, comprising: providing a flywheel housing for accommodating a flywheel, the flywheel housing having the solid outer side region intended to face an oil pan of the internal combustion engine; forming the through hole at a solid portion of the outer side region; and arranging a vibration absorbing material portion at the through hole, such that the vibration absorbing material portion is arranged to seal the through hole.

* * * * *